United States Patent
Masuda (10) Patent No.: US 10,528,854 B2
(45) Date of Patent: Jan. 7, 2020

(54) IMAGE FORMING APPARATUS PERFORMING PRINT PROCESSING IN COLOR OR BLACK-AND-WHITE PRINT MODES BY ANALYZING PIXEL INFORMATION OF IMAGE DATA GENERATED WHEN A PRINT JOB IS INPUT

(71) Applicant: RISO KAGAKU CORPORATION, Tokyo (JP)

(72) Inventor: Shigeru Masuda, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 16/193,394

(22) Filed: Nov. 16, 2018

(65) Prior Publication Data

US 2019/0164026 A1 May 30, 2019

(30) Foreign Application Priority Data

Nov. 30, 2017 (JP) .................................. 2017-230021

(51) Int. Cl.
| | |
|---|---|
| G06K 15/00 | (2006.01) |
| G06K 15/02 | (2006.01) |
| G06F 3/12 | (2006.01) |
| G06K 15/10 | (2006.01) |

(52) U.S. Cl.
CPC ....... *G06K 15/1823* (2013.01); *G06F 3/1204* (2013.01); *G06F 3/1212* (2013.01); *G06F 3/1231* (2013.01); *G06F 3/1276* (2013.01); *G06K 15/102* (2013.01); *G06K 15/1836* (2013.01); *G06K 15/1843* (2013.01)

(58) Field of Classification Search
None
See application file for complete search history.

(56) References Cited

U.S. PATENT DOCUMENTS

| 8,164,766 B2* | 4/2012 | van de Capelle ..... G06F 3/1205 358/1.13 |
| 9,729,759 B1* | 8/2017 | Robinson ............. G06K 15/407 |
| 2008/0079976 A1* | 4/2008 | van de Capelle ..... G06F 3/1205 358/1.13 |
| 2015/0181081 A1* | 6/2015 | Hakamada ............... H04N 1/46 358/2.1 |

(Continued)

FOREIGN PATENT DOCUMENTS

| JP | 2013-120401 A | 6/2013 |
| JP | 2015-122696 A | 7/2015 |

*Primary Examiner* — Barbara R Reinier
(74) *Attorney, Agent, or Firm* — Greenblum & Bernstein, P.L.C.

(57) ABSTRACT

A print-mode determination processor determines the print mode of a print job that is described in a page description language (PDL) and that has a print mode set to an automatic determination mode, using image data generated for a preflight check by a preflight checker that performs a preflight check of image data of a print job. The image data for a preflight check has a resolution lower than that of thumbnail image data and sufficient to determine whether to set a color print mode or a black-and-white print mode, such as presence or absence of a color part in the image data of the print job or the degree of the color part, so that the time required for generating and analyzing image data for print mode determination can be shortened.

4 Claims, 3 Drawing Sheets

(56) References Cited

U.S. PATENT DOCUMENTS

2015/0206115 A1* 7/2015 Matsunaga .......... G06Q 20/145
  358/2.1
2017/0300272 A1* 10/2017 Kalloe ................. G06F 3/1204
2017/0357883 A1* 12/2017 Takahata .............. G06F 3/1208

* cited by examiner

IMAGE FORMING APPARATUS PERFORMING PRINT PROCESSING IN COLOR OR BLACK-AND-WHITE PRINT MODES BY ANALYZING PIXEL INFORMATION OF IMAGE DATA GENERATED WHEN A PRINT JOB IS INPUT

BACKGROUND

1. Technical Field

The present invention relates to an image forming apparatus that analyzes a print job and automatically determines whether to output an image in a color mode or a black-and-white mode.

2. Related Art

In a case where an image forming apparatus compliant with both color printing and black-and-white printing executes a print job and prints an image, it is necessary to determine whether to execute the print job in either a color print mode or a black-and-white print mode. Determination of the print mode can be made, for example, by a user who designates the print mode as one of print settings when a print job is generated by a printer driver.

In order to enable a user to designate the color mode or the black-and-white mode as the print mode, the user needs to properly know the contents of an image to be printed. However, for example, when an image where only one of all pages is partly colored is to be printed, it is not always true that the user knows there is a color part.

On the other hand, if determination of the color mode or the black-and-white mode as the print mode by a user is substantially premised on that the user properly knows every detail of contents of an image, mental and physical load on the user is increased.

In this connection, for example, Patent Literature 1 (Japanese Patent Application Publication No. 2013-120401) and Patent Literature 2 (Japanese Patent Application Publication No. 2015-122696) propose a technique that whether to cause an image forming apparatus to execute a print job in a color print mode or a black-and-white print mode is automatically determined on the basis of analysis of image data.

Patent Literature 1 proposes a technique that either a printer driver or an image forming apparatus generates image data (thumbnail image data) for displaying a thumbnail image of an image to be printed based on a print job described in a page description language (PDL) such as a PDF (Portable Document Format) or a PostScript (PS, registered trademark, the same applies hereinafter), analyzes pixel information of the thumbnail image data, and determines whether to designate a color mode or a black-and-white mode as the print mode. In this case, the printer driver corresponds to an output source of the print job and the image forming apparatus corresponds to an input destination of the print job.

Patent Literature 2 proposes a technique that when image data for printing is generated by performing raster image processing on a print job described in a PDL, whether to print an image in a color mode or a black-and-white mode is automatically determined for each page according to the degree of color pixels in the image data of each page.

SUMMARY

However, the proposition of Patent Literature 1 is premised on a fact that either the printer driver or the image forming apparatus has a function to display thumbnail images and it cannot be applied to a case where neither the printer driver nor the image forming apparatus has the function to display a thumbnail image.

The proposition of Patent Literature 2 requires analysis of pixel information of all pixels in image data to determine the degree of color pixels. Therefore, the load of determination processing on the print mode is large.

In the proposition of Patent Literature 2, there is also mentioned a possibility that an image forming apparatus generates thumbnail image data to be used also for a preflight check before raster image processing and analyzes pixel information of all pixels in the thumbnail image data to determine the degree of color pixels.

However, an image forming apparatus having no function to display a thumbnail image does not even generate image data assuming display of a thumbnail image, and thus this concept cannot be used as the proposition of Patent Literature 1.

Even when an image forming apparatus has a function to display a thumbnail image, pixel information of a number of pixels required for display of a thumbnail image needs to be analyzed to determine the print mode. Accordingly, the mode determination processing inevitably takes at least a time required for analyzing the pixel information of image data having a number of pixels assuming display.

The present invention has been made in view of the above problem. An object of the present invention is to provide an image forming apparatus that can analyze pixel information of image data and determine the print mode in a shorter time than a case of image data of an image generated while assuming display, such as a thumbnail image or a preview image, regardless of whether the apparatus has a function to display an image such as a thumbnail image or a preview image.

In order to achieve the above object, an image forming apparatus according to an aspect of the present invention comprises:

a preflight image generator that generates image data for a preflight check when a print job described in a page description language is input;

a print mode determiner that determines whether to execute the print job in a color print mode or a black-and-white print mode by analyzing pixel information of the image data for a preflight check;

a preflight checker that performs a preflight check of the print job using the image data for a preflight check;

a raster image processor that performs raster image processing in a print mode determined by the print mode determiner to the print job having been subjected to the preflight check by the preflight checker so as to generate image data for printing; and a print unit that executes the print job using the image data for printing generated by the raster image processor, and performs printing processing in a print mode determined by the print mode determiner.

According to the present invention, it is possible to analyze pixel information of image data and determine the print mode in a shorter time than a case of image data of an image generated while assuming display, such as a thumbnail image or a preview image, regardless of whether an apparatus has a function to display an image such as a thumbnail image or a preview image.

BRIEF DESCRIPTION OF DRAWINGS

The invention will now be described with reference to the accompanying drawings wherein.

DETAILED DESCRIPTION

Figure 1:
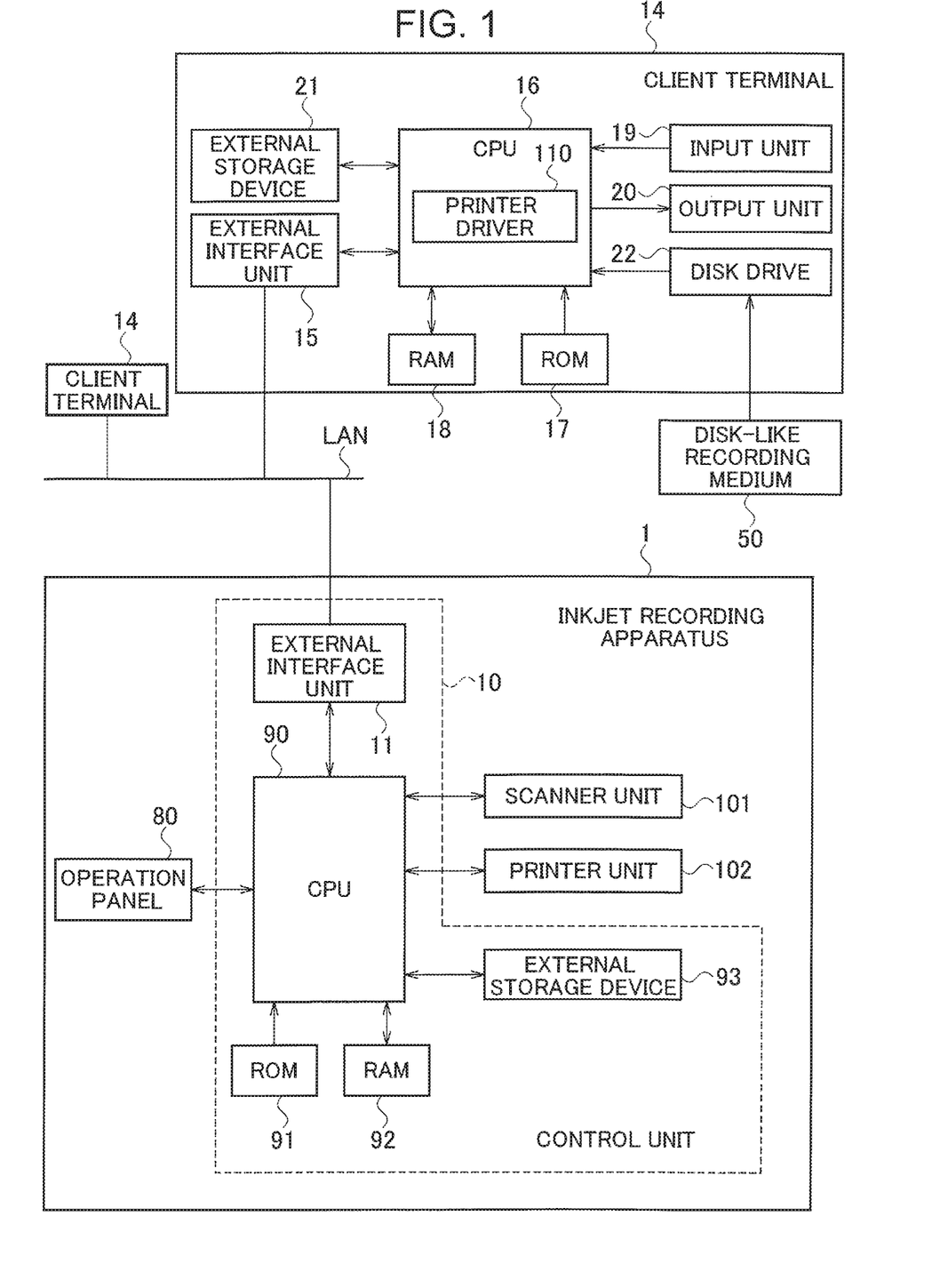
FIG. 1 is a block diagram illustrating a schematic configuration of a printer network system according to an embodiment of the present invention.

Embodiments of the present invention will be described below with reference to the drawings. FIG. 1 is a block diagram illustrating a schematic configuration of a printer network system according to an embodiment of the present invention. An inkjet recording apparatus 1 according to the present embodiment illustrated in FIG. 1 is an inkjet line color printer.

(Overall Configuration of Printer Network System)

As illustrated in FIG. 1, the printer network system according to the present embodiment includes the inkjet recording apparatus 1 (image forming apparatus) and a plurality of client terminals 14.

(Configuration of Client Terminals)

Each of the client terminals 14 is constituted of a PC (Personal Computer) and the like. The client terminals 14 respectively include a CPU 16 that performs various processes based on a control program stored in a ROM 17. A RAM 18 that functions as a working area, an input unit 19 constituted of a keyboard, a mouse, and the like, an output unit 20 constituted of a liquid crystal display and the like, an external storage device 21, and a disk drive 22 are connected to the CPU 16.

A storage area for an application program to generate document data including a print image such as a text or an image, a storage area for a printer driver program of the inkjet recording apparatus 1, and a storage area for other various application programs are provided in the external storage device 21. A database area is also provided in the external storage device 21. The document data generated using the application program and the like is stored in the database area.

The CPU 16 is an arithmetic device constituted of a processor and other peripheral devices such as a memory and starts an application program in the external storage device 21 in response to a start request input from the input unit 19. The CPU 16 also generates document data of an image on the started application program according to input of parameters based on the input unit 19 or the like. The generated document data is displayed or output by the output unit 20, and when a save request is input from the input unit 19, the generated document data is stored in the database area of the external storage device 21.

The document data stored in the database area of the external storage device 21 is read from the external storage device 21 when a read request is input from the input unit 19 while the application program is running. A print image of the read document data can be displayed or output by the output unit 20 and can be processed on the application program to regenerate new document data.

When a print request for document data generated by a document application program or a form-creation application program is input, the CPU 16 executes the printer driver program on the CPU 16 to virtually implement a printer driver 110 on the CPU 16. A print job is output to the inkjet recording apparatus 1 with the printer driver 110.

The printer driver 110 is a data conversion program executed on the client terminal 14 to control the inkjet recording apparatus 1 connected to the client terminal 14. The program of the printer driver 110 is created to be adapted to the specifications of each of the inkjet recording apparatuses 1 to be used for printing.

Each of the printer drivers 110 acquires document data including a print image generated by the document application program or the like and generates a print job in accordance with predetermined print setting information when the inkjet recording apparatus 1 corresponding thereto is selected as an apparatus to be used for printing. The generated print job is output from an external interface unit 15 to an external interface unit 11 of a control unit 10.

The print setting information is information required for normal print, such as the size of the document data, the resolution, the size of print sheets, and the print direction. The print setting information also includes information related to a print mode in a case where a print image is printed by the inkjet recording apparatus 1.

The print mode includes a color print mode of printing document data as a color image, a black-and-white print mode of printing document data as a black-and-white image, and an automatic determination mode of causing the inkjet recording apparatus 1 to automatically determine whether to print document data in the color print mode or the black-and-white print mode.

(Output Format of Print Job)

The printer driver 110 can generate a print job in two patterns and output the generated print job to the inkjet recording apparatus 1.

In the first pattern, the printer driver 110 converts vector data generated by the application program into raster data and outputs data of a print image to the inkjet recording apparatus 1 with the print setting information. In this case, the printer driver 110 converts the raster data into a format processable by the inkjet recording apparatus 1 corresponding to the printer driver 110.

In the second pattern, the printer driver 110 keeps the vector data generated by the application program as it is and outputs the print image data as a print job described in a PDL (such as PDL data or PostScript (PS) data) to the inkjet recording apparatus 1 with the print setting information.

The print job described in the PDL can configure data of a print image with a photo or an illustration pasted on the print image embedded as it is as data. The print job can also configure a character or a symbol in a print image with a control symbol or a font, not with a picture. Information of a font to be used in printing is specified in the print setting information.

The printer driver program and various application programs for causing the CPU 16 to perform the processes described above can be read from a disk-like recording medium 50, such as an optical disk, by the disk drive 22 of each of the client terminals 14 to be installed (stored) in the external storage device 21.

(Configuration of Inkjet Recording Apparatus)

The inkjet recording apparatus 1 has a scanner unit 101, a printer unit 102 (print unit), and the control unit 10.

The scanner unit 101 reads an image on a document as a document image and outputs information such as image data of the document image and the size of the document to the control unit 10.

The printer unit 102 prints (including copy printing) the document image on a recording sheet (one side or both sides) on the basis of a print job. The print job can be a print job generated by the control unit 10 on the basis of information such as the image data or the size of the document image output from the scanner unit 101, a copy condition input from an operation panel 80 (described later) connected to the control unit 10 and the like. The print job can be also a print job input from one of the client terminals 14 to the control unit 10.

The recording sheet to be used for printing of print images by the printer unit 102 is conveyed from a feeder (not illustrated) to a discharger (not illustrated) via the printer unit 102.

The control unit 10 executes overall control of the inkjet recording apparatus 1. Respective external interface units 15 of the client terminals 14 (only one of the client terminals 14 is representatively illustrated in FIG. 1) are connected to the external interface unit 11 of the control unit 10 via a local area network LAN.

The control unit 10 receives a print job from each of the client terminals 14. The control unit 10 executes each of the received print jobs under the condition specified in the print setting information and causes the printer unit 102 to perform printing on a recording sheet for print images. Details of this point will be described later.

The operation panel 80 on which a display with a touch panel function or an operation key is provided is connected to the control unit 10. The operation panel 80 is placed on an upper part of the inkjet recording apparatus 1.

The operation panel 80 can be used as an operation unit to which a user inputs copy conditions such as the number of copies or a copy multiplying factor at the time of copy printing of a print image set in the scanner unit 101. When the print mode in the print setting information of a print job is set to the automatic determination mode, the control unit 10 performs automatic determination processing on the print mode (color or black-and-white), and the operation panel 80 can be used also as an operation unit to which a user inputs an operating mode of the automatic determination processing of the print mode (color or black-and-white). Details of input of the operating mode will be described later.

The control unit 10 of the inkjet recording apparatus 1 that causes the printer unit 102 described above to perform a printing operation includes a CPU 90. The CPU 90 controls the operations of the scanner unit 101 and the printer unit 102 according to the contents input and set through the operation panel 80 on the basis of a program and setting information stored in a ROM 91.

The control unit 10 includes a RAM 92, and print jobs input from the client terminals 14 to the control unit 10 and the number of prints at the time of copying and various types of setting contents input through the operation panel 80 are stored in the RAM 92 as needed.

The RAM 92 has a frame memory area (an engine transfer memory). Print data generated by the CPU 90 in response to the print jobs input from the client terminals 14 to the control unit 10 is temporarily stored in the frame memory area until the print data is output to the printer unit 102.

The control unit 10 further includes an external storage device 93 and the external storage device 93 is connected to the CPU 90. A plurality of areas for storing print jobs transferred from the RAM 92 described above are provided in the external storage device 93.

The CPU 90 causes the program stored in the ROM 91 to be executed on the CPU 90 to cause the printer unit 102 to print a print image on a recording sheet under the print condition set in the print setting information of an input print job.

When data of a print job the control unit 10 has received is raster data, the CPU 90 extracts the raster data as a bitmap, generates print data of the print image, and causes the printer unit 102 to print the print image on a recording sheet.

At this time, when the print mode is set to the automatic determination mode in the print setting information of the print job, the CPU 90 determines whether to set the print mode to the color print mode or the black-and-white print mode based on information of respective pixels in the raster data. The CPU 90 causes the printer unit 102 to print the print image on a recording sheet in the determined print mode.

When the print job the control unit 10 has received is described in the PDL, the CPU 90 performs a preflight check on data (vector data) related to the print image of the received print job, then converts the vector data into raster data by raster image processing, and extracts the raster data as a bitmap to generate print data of the print image.

The print job is then executed under a condition specified in the print setting information and the printer unit 102 is caused to perform printing of the print image on a recording sheet.

Figure 2:
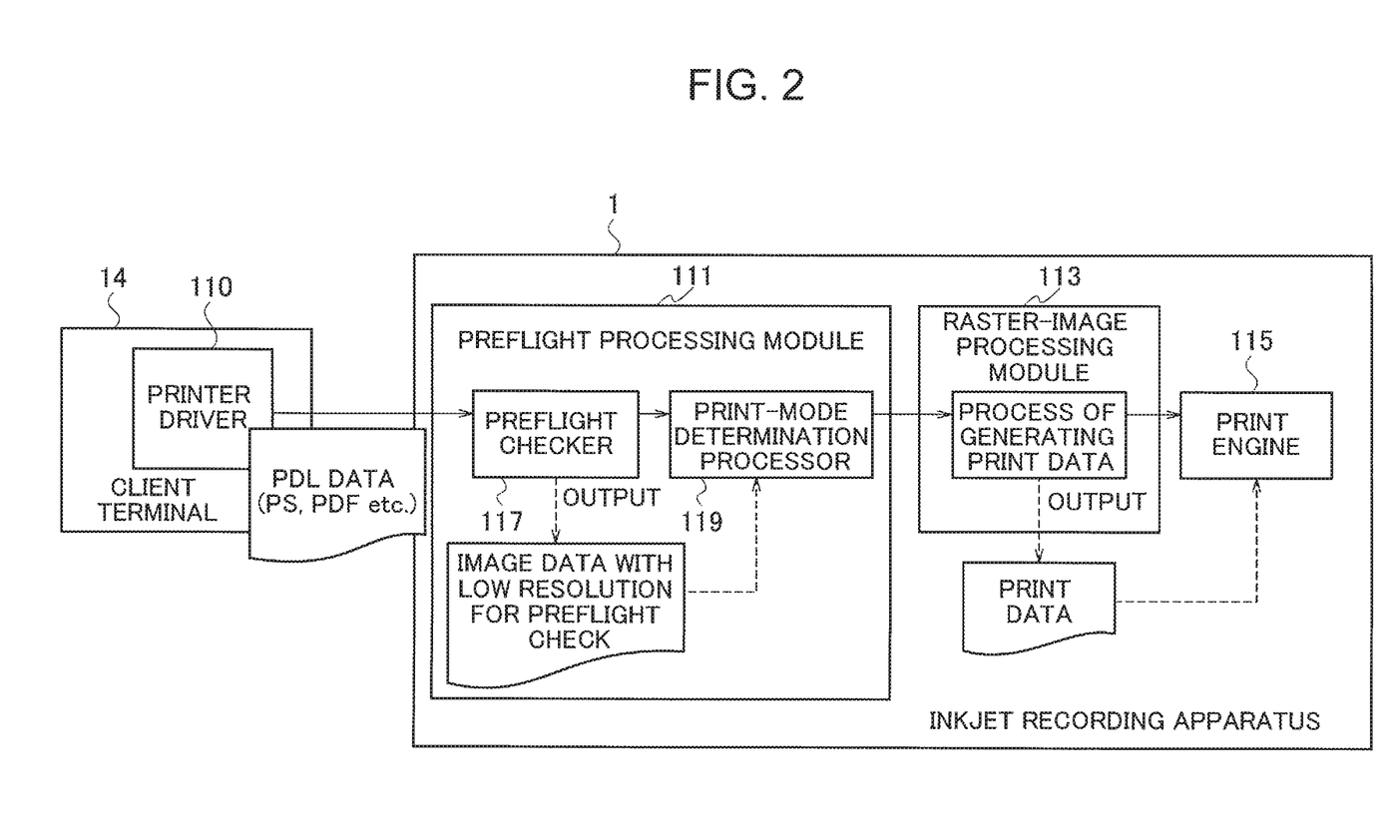
FIG. 2 is a block diagram illustrating various modules virtually constructed on a CPU illustrated in FIG. 1.

The CPU 90 virtually construct various modules for causing the program stored in the ROM 91 to be executed on the CPU 90, thereby executing a print job described in the PDL and causing the printer unit 102 to perform a printing operation on the CPU 90. FIG. 2 is a block diagram illustrating various modules virtually constructed on the CPU 90.

As illustrated in FIG. 2, the various modules virtually constructed on the CPU 90 to execute a print job described in the PDL include a preflight processing module 111, a raster-image processing module 113, and a print engine 115.

The preflight processing module 111 includes a preflight checker 117 and a print-mode determination processor 119 (print mode determiner).

The preflight checker 117 performs a preflight on an input print job. As items of a preflight check, for example, there are (1) a check on whether vector data is not damaged, (2) a check on whether data of an image that is set as an embedded object of a print image in the print setting information is included in vector data, and (3) a check on whether a font stored and retained in the external storage device 93 of the inkjet recording apparatus 1 is set in the print setting information as a font to be used for printing of characters and symbols of a print image.

For this purpose, the preflight checker 117 converts vector data of an input print job into raster data to generate image data (raster data) for a preflight check. In the present embodiment, the preflight checker 117 corresponds to a preflight image generator and a preflight checker.

Image data for a preflight check is different from image data of an image to be displayed, such as a thumbnail image or a preview image, and is simply image data for performing the preflight check described above on data (vector data) of a print job and obtaining a result of the preflight check. Therefore, image data for a preflight check that is not used for display does not require a resolution equivalent to that of image data such as a thumbnail image or a preview image assumed to be displayed.

Accordingly, the preflight checker 117 can perform a satisfactory preflight check on a print job even when pixel information is analyzed using image data that is generated from data (vector data) of a print job described in the PDL and that has a lower resolution than that of image data to be used for display, as image data for a preflight check.

The image data for a preflight check generated by the preflight checker 117 is also output to the print-mode determination processor 119.

When the color print mode or the black-and-white print mode is specified as the print mode in the print setting information of a print job described in the PDL, the print-mode determination processor 119 stores the specified print mode in the external storage device 93 (by overwriting). The vector data of the print job input from the preflight checker 117 is output to the raster-image processing module 113.

When the print mode is set to the automatic determination mode in the print setting information of a print job described in the PDL, the print-mode determination processor 119 determines the print mode of the print job described in the PDL using the image data for a preflight check generated by the preflight checker 117.

At the time of determining the print mode of a print job described in the PDL, the print-mode determination processor 119 performs automatic determination processing on the print mode (color or black-and-white) in an operation mode input by a user through the operation panel 80.

Figure 3:
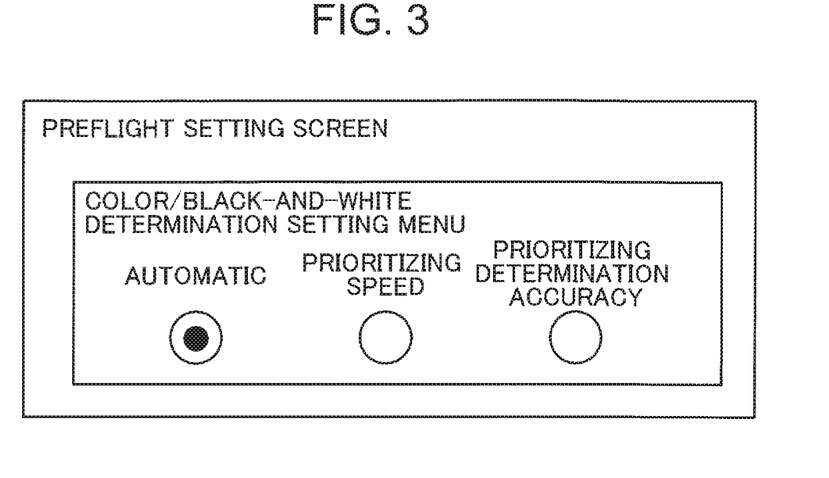
FIG. 3 is an explanatory diagram illustrating a preflight setting screen displayed on an operation panel in FIG. 1 so as to input settings of an operation mode when a print mode is to be automatically determined by a print-mode determination processor in FIG. 2.

FIG. 3 is an explanatory diagram illustrating a preflight setting screen displayed on the display of the operation panel 80 in FIG. 1 so as to enable a user to input settings of an operation mode when the print mode of a print job described in the PDL is to be automatically determined by the print-mode determination processor 119.

The preflight setting screen in FIG. 3 can be displayed on the display of the operation panel 80, for example, through selection of a preflight setting menu by a touch operation on the display of the operation panel 80.

On the preflight setting screen, three options including "automatic", "prioritizing speed", and "prioritizing determination accuracy" related to the operation mode of the print-mode determination processing as a color/black-and-white determination setting menu are displayed with check-boxes. When the user touches the checkbox of a desired option, the operation mode corresponding to the touched option is stored in the external storage device 93 of the control unit 10 (by overwriting). The print-mode determination processor 119 performs determination processing on the print mode in the operation mode stored in the external storage device 93.

In the present embodiment, the display of the operation panel 80 on which the preflight setting screen is displayed corresponds to a priority-mode setting unit.

In the "automatic" operation mode displayed as the color/black-and-white determination setting menu on the preflight setting screen, the resolution of the image data for a preflight check generated by the preflight checker 117 is set to a predetermined default resolution.

In the "automatic" operation mode, the pitch of pixels on which the pixel information is analyzed by the print-mode determination processor 119 among pixels of the image data for a preflight check is set to a predetermined default pitch.

The default resolution of the image data for a preflight check and the default pitch of pixels on which the pixel information is analyzed by the print-mode determination processor 119 in the "automatic" operation mode are set for each of the document sizes. The document size is known based on the print setting information of a print job.

Next, in the operation modes "prioritizing speed" and "prioritizing determination accuracy" displayed as the color/black-and-white determination setting menu on the preflight setting screen, at least one of the resolution of the image data for a preflight check generated by the preflight checker 117 and the pitch of pixels on which the pixel information is analyzed by the print-mode determination processor 119 among the pixels of the image data for a preflight check is set to a value described below.

In the operation mode "prioritizing speed" out of these modes, the resolution of the image data for a preflight check generated by the preflight checker 117 is set to a resolution equal to or lower than a predetermined default resolution. The pitch of pixels on which the pixel information is analyzed by the print-mode determination processor 119 among the pixels of the image data for a preflight check is set to a pitch equal to or larger than a predetermined default pitch.

On the other hand, in the operation mode "prioritizing determination accuracy", the resolution of the image data for a preflight check generated by the preflight checker 117 is set to a resolution equal to or higher than the predetermined default resolution. The pitch of pixels on which the pixel information is analyzed by the print-mode determination processor 119 among the pixels of the image data for a preflight check is set to a pitch equal to or smaller than the predetermined default pitch.

The default resolution of the image data for a preflight check and the default pitch of pixels on which the pixel information is analyzed by the print-mode determination processor 119 in each of the operation modes "prioritizing speed" and "prioritizing determination accuracy" are set to be equal regardless of the document size. However, the default resolution and the default pitch can be independently set for each of the document sizes.

The resolution and the pitch of pixels on which the pixel information is analyzed in each of the operation modes are respectively set by the control unit 10 to values corresponding to the operation mode set on the preflight setting screen.

A procedure of the print-mode determination processing (color/black-and-white determination processing) performed by the print-mode determination processor 119 is described with reference to a flowchart of FIG. 4.

First, the print-mode determination processor 119 verifies the setting of the operation mode of the print-mode determination processing, which is stored in the external storage device 93 of the control unit 10 (step S1).

When the setting of the operation mode is "automatic" (step S1: "automatic"), the print-mode determination processor 119 operates as an analysis amount adjuster, and the print-mode determination processor 119 sets the resolution of the image data for a preflight check generated by the preflight checker 117 to the default resolution corresponding to the document size and sets the pitch of pixels on which the pixel information is analyzed by the print-mode determination processor 119 among the pixels of the image data for a preflight check to the default pitch corresponding to the document size (step S3).

Specifically, when the document size is B5, the resolution of the image data for a preflight check generated by the preflight checker 117 is set to 120 dpi (data per inch) which is a default value in a case where the document size is B5, and the pixel pitch of the image data for a preflight check on which the pixel information is analyzed by the print-mode determination processor 119 is set to once per pixel without decimation.

In a case where the document sizes are A4 and A3, respectively, the resolution of the image data for a preflight check generated by the preflight checker 117 is set to 60 dpi (common to A4 and A3), which is a default value in the case where the document sizes are A4 and A3.

Further, the pixel pitch of the image data for a preflight check on which the pixel information is analyzed by the print-mode determination processor 119 is set to once per pixel without decimation in the case where the document size is A4, and is set to once every other pixel (once every two pixels) by decimation in the case where the document size is A3.

On the other hand, when the setting of the operation mode is other than "automatic" ("prioritizing speed" or "prioritizing determination accuracy") (step S1: "other than automatic"), the print-mode determination processor 119 operates as an analysis amount changer, and the print-mode determination processor 119 sets the resolution of the image data for a preflight check generated by the preflight checker 117 to a resolution previously defined and sets the pitch of pixels on which the pixel information is analyzed by the print-mode determination processor 119 among the pixels of the image data for a preflight check to a pitch previously defined (step S5).

Specifically, when the setting of the operation mode is "prioritizing speed", the resolution of the image data for a preflight check generated by the preflight checker 117 is set to 60 dpi, and the pixel pitch of the image data for a preflight check on which the pixel information is analyzed by the print-mode determination processor 119 is set to once every four pixels by decimation, regardless of the document size.

When the setting of the operation mode is "prioritizing determination accuracy", the resolution of the image data for a preflight check generated by the preflight checker 117 is set to 300 dpi, and the pixel pitch of the image data for a preflight check on which the pixel information is analyzed by the print-mode determination processor 119 is set to once per pixel without decimation, regardless of the document size.

The print-mode determination processor 119 then performs print-mode determination processing (color/black-and-white determination processing) of a print job described in the PDL with the contents set in step S3 or S5 according to the setting of the operation mode verified in step S1 (step S7) and ends a series of processes.

Figure 4:
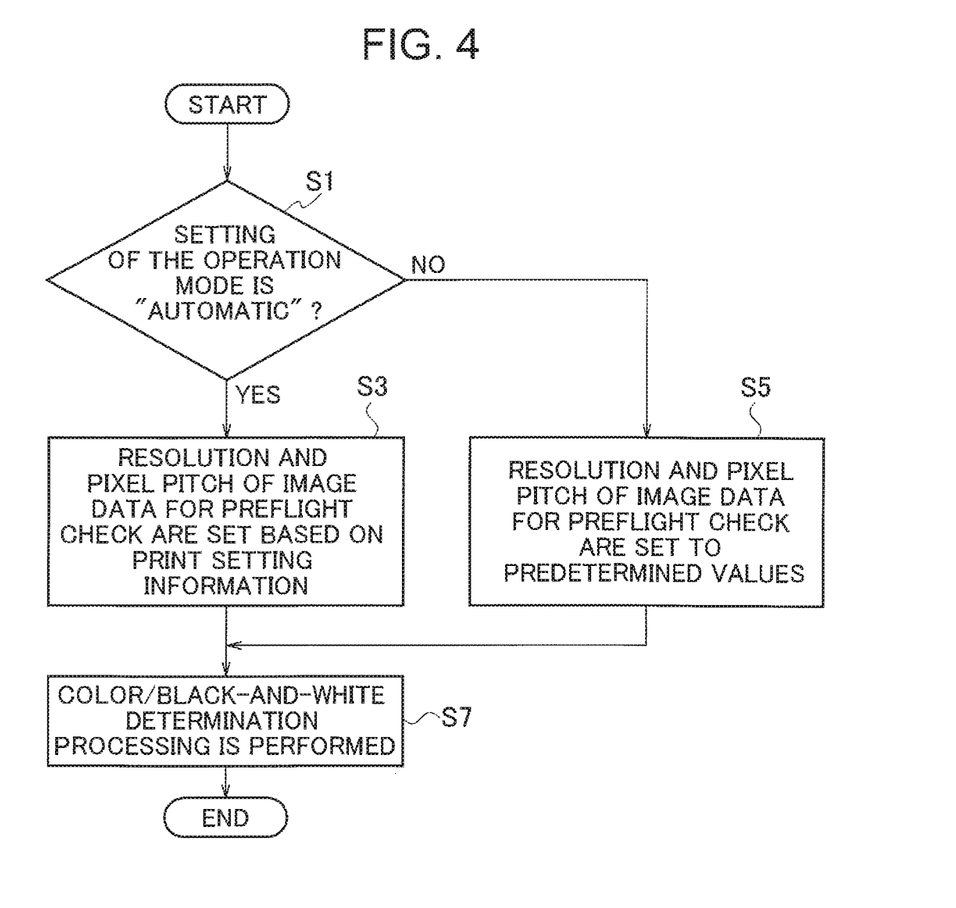
FIG. 4 is a flowchart illustrating a procedure of print-mode determination processing performed by the print-mode determination processor in FIG. 2.

As is apparent from the above descriptions, in the present embodiment, step S3 in the flowchart of FIG. 4 is processing performed by the analysis amount adjuster and step S5 in FIG. 4 is processing performed by the analysis amount changer.

The print mode determined by the print-mode determination processor 119 is stored in the external storage device 93 (by overwriting).

The raster-image processing module 113 (raster image processor) converts the vector data of the print job input from the print-mode determination processor 119 into raster data by the raster image processing to extract a bitmap and generate print data (dot data) of the print image.

At this time, the raster-image processing module 113 performs color conversion processing with the contents according to the print mode stored in the external storage device 93. For example, when the print mode in the external storage device 93 is the color print mode, the raster-image processing module 113 converts each pixel of the raster data from an RGB pixel value into a CKMY pixel value with reference to profile data of a lookup table for color conversion in the external storage device 93.

When the print mode of the external storage device 93 is the black-and-white print mode, the raster-image processing module 113 converts each pixel of the raster data from an RGB pixel value into a K (CKMY in the case of composite black) pixel value with reference to profile data of a lookup table for black-and-white conversion in the external storage device 93.

The print engine 115 (print unit) causes the printer unit 102 to print a print image on a recording sheet using the print data (dot data) generated by the raster-image processing module 113.

In the inkjet recording apparatus 1 according to the present embodiment having the configuration described above, when the print mode is set to the automatic determination mode in the print setting information of a print job described in the PDL, the print-mode determination processor 119 determines the print mode of the print job using image data for a preflight check generated by the preflight checker 117 to perform a preflight check of the print job.

At this time, the image data used for determination of the print mode of a print job by the print-mode determination processor 119 is generated by the preflight checker 117 for the preflight check and is not newly generated for determination of the print mode. Furthermore, the image data for the preflight check is not image data to be displayed as image data of a thumbnail image or a preview image.

Therefore, while having a sufficient resolution to determine whether to set the color mode or the black-and-white mode as the print mode, such as the presence or absence of a color image in a print job or the degree of a color image included in a print job, the image data for the preflight check does not have such a high resolution as that of image data to be displayed, such as image data of a thumbnail image or a preview image.

Accordingly, the print mode determination can be made by pixel information analysis on image data with a low resolution, which is not newly generated but is generated for a preflight check, and thus the time required for generating the image data for print mode determination or analyzing the pixel information can be shortened. Therefore, the print mode of a print job that is described in the PDL and is set to the automatic determination mode as the print mode can be determined in a short time.

Further, with the inkjet recording apparatus 1 according to the present embodiment, when the print mode is set to the automatic determination mode, the analysis amount on the pixel information by the print-mode determination processor 119 can be equalized by generating image data for a preflight check with a lower resolution or reducing the number of pixels on which the pixel information is analyzed by the print-mode determination processor 119 by decimation as the document size is larger. Therefore, it is possible to prevent the determination time of the print mode from greatly varying according to differences in the document size.

In the present embodiment, the resolution of image data used to determine the print mode by the print-mode determination processor 119 or the ratio of pixels of image data on which the pixel information is analyzed by the print-mode determination processor 119 is changed according to the document sizes.

However, for example, the resolution of the image data used to determine the print mode by the print-mode determination processor 119 or the ratio of pixels of image data on which the pixel information is analyzed by the print-mode determination processor 119 can be changed according to whether the print resolution is high or low, differences in specifics of the print quality, or the types (paper qualities) of recording sheets to be used for printing, which are set in the print setting information instead of the document sizes.

In the embodiment described above, a case of using the inkjet recording apparatus 1 as an image forming apparatus has been described as an example. However, the present invention is not limited to the inkjet method and can be widely applied also to image forming apparatuses that include, as well as a scanner, a printer according to methods other than the inkjet method, such as an electrophotographic method or a stencil printing method.

Based on the embodiment described above, the following aspects of the invention are disclosed.

First, as the first aspect of the present invention, there is disclosed an image forming apparatus comprising:

a preflight image generator that generates image data for a preflight check when a print job described in a page description language is input;

a print mode determiner that determines whether to execute the print job in a color print mode or a black-and-white print mode by analyzing pixel information of the image data for a preflight check;

a preflight checker that performs a preflight check of the print job using the image data for a preflight check;

a raster image processor that performs raster image processing in a print mode determined by the print mode determiner to the print job having been subjected to the preflight check by the preflight checker so as to generate image data for printing; and a print unit that executes the print job using the image data for printing generated by the raster image processor, and performs printing processing in a print mode determined by the print mode determiner.

According to the image forming apparatus of the first aspect of the present invention, when a print job described in a page description language is input, the preflight image generator does not generate image data of a thumbnail image or a preview image assumed to be displayed but generates image data used for performing a preflight check.

The preflight check is processing of checking whether data is not damaged, whether an image that is expected to be embedded is properly included in data, or whether a font included in the image forming apparatus is specified, for example, and does not require display of an image. Accordingly, even image data with a lower resolution than that of image data for a thumbnail image or a preview image assumed to be displayed can be sufficiently used for the preflight check.

Therefore, by analyzing pixel information of image data with a lower resolution than that of image data for a thumbnail image or a preview image assumed to be displayed, it is possible to determine whether to execute a print job in the color print mode or the black-and-white print mode in a short time, regardless of the presence or absence of a display function for an image such as a thumbnail image or a preview image.

Next, as the second aspect of the present invention, there is disclosed an image forming apparatus further comprising an analysis amount adjuster that adjusts at least one of a resolution of the image data for a preflight check generated by the preflight image generator, and a ratio of pixels on which pixel information is analyzed by the print mode determiner among pixels of the image data for a preflight check, on a basis of setting contents of print setting information of the print job so as to equalize an analysis amount of pixel information by the print mode determiner regardless of a difference in setting contents of the print setting information.

According to the image forming apparatus of the second aspect of the present invention, for example, when the document size of an image to be printed by execution of a print job is larger than a standard size, the analysis amount adjuster performs at least one of setting the resolution of image data for a preflight check to a resolution equal to or lower than a default resolution corresponding to a document of the standard size and setting the number of pixels on which the pixel information is analyzed for a preflight check to the number of pixels equal to or smaller than a default number of pixels corresponding to a document of the standard size so as to prevent the analysis amount of pixel information by the print mode determiner from greatly increasing from an analysis amount when the document size is the standard size.

Accordingly, for example, the time required by the print mode determiner to determine the print mode of a print job can be suppressed to a certain time regardless of the document size of an image to be printed based on print setting information of the print job.

Alternatively, the resolution of image data for a preflight check or the ratio of pixels on which the pixel information is analyzed by the print mode determiner can be adjusted by the analysis amount adjuster according to whether the print resolution is high or low, differences in the specifics of the print quality, the types (paper qualities) of recording sheets to be used for printing or the like, which are set in the print setting information instead of the document size so as to equalize the analysis amount of pixel information by the print mode determiner regardless of the difference in the setting contents of the print setting information.

Next, as the third aspect of the present invention, there is disclosed an image forming apparatus comprising:

a priority-mode setting unit, to which either a determination-speed prioritizing mode of increasing a speed of determination of the print mode by the print mode determiner to be higher than a default speed, or a determination-accuracy prioritizing mode of increasing an accuracy of determination of the print mode by the print mode determiner to be higher than a default accuracy is set as needed; and an analysis amount changer that changes at least one of a resolution of the image data for a preflight check generated by the preflight image generator, and a ratio of pixels on which pixel information is analyzed by the print mode determiner among pixels of the image data for a preflight check, to cause an analysis amount of pixel information by the print mode determiner to be smaller than a default analysis amount defined based on setting contents of print setting information of the print job when the determination-speed prioritizing mode is set in the priority-mode setting unit, and to cause the analysis amount to be larger than the default analysis amount when the determination-accuracy prioritizing mode is set in the priority-mode setting unit.

According to the image forming apparatus of the third aspect of the present invention, for example, when the determination-speed prioritizing mode of increasing the determination speed of the print mode to be higher than a default speed is set, the analysis amount adjuster performs at least one of decreasing the resolution of the image data for a preflight check generated by the preflight image generator, to be lower than a default value or decimating pixels on which the pixel information is analyzed for a preflight check, in such a manner that the analysis amount of the pixel information by the print mode determiner becomes smaller than the default analysis amount defined based on setting contents of print setting information of a print job, thereby reducing the analysis amount of the pixel information by the print mode determiner.

Further, for example, when the determination-accuracy prioritizing mode of increasing the determination accuracy of the print mode to be higher than a default accuracy is set, the analysis amount adjuster performs at least one of increasing the resolution of the image data for a preflight check generated by the preflight image generator, to be higher than the default value or decimating no or less pixels on which the pixel information is analyzed for a preflight check, in such a manner that the analysis amount of the pixel information by the print mode determiner becomes larger than the default analysis amount defined based on setting contents of print setting information of a print job, thereby increasing the analysis amount of the pixel information by the print mode determiner to be higher than a default value.

Accordingly, by setting the determination-speed prioritizing mode or the determination-accuracy prioritizing mode in the priority-mode setting unit, it is possible to arbitrarily select, according to needs, an operation mode of prioritizing high-speed processing of a print job by simplifying determination of the print mode to shorten the determination time, or an operation mode of prioritizing increase in the determination accuracy by keeping a sufficiently long determination time of the print mode even if the speed of the processing of a print job is lowered.

The present invention is not limited exactly to the above embodiment, and when the invention is actually implemented, it may be embodied in other specific forms without departing from the spirit of the invention while modifying the constituent elements. In addition, various inventions may be formed by appropriate combinations of a plurality of constituent elements disclosed in the above embodiment. For example, several constituent elements may be omitted from all the constituent elements described in the above embodiment.

Further, for example, respective functions and processes described above may be implemented on one or more processing circuits. The processing circuits include programmed processors, electric circuits and the like, and also include devices such as application specific integrated circuits (ASIC) and circuit constituent elements that are arranged to execute the functions described above.

This application claims priority based on Japanese Patent Application No. 2017-230021 (filed on Nov. 30, 2017), and the entire content of this application is incorporated herein by reference.

REFERENCE SIGNS LIST 1 inkjet recording apparatus (image forming apparatus)
10 control unit
11 external interface unit
14 client terminal
15 external interface unit
16 CPU
17 ROM
18 RAM
19 input unit
20 output unit
21 external storage device
22 disk drive
50 disk-like recording medium
80 operation panel
90 CPU
91 ROM
92 RAM
93 external storage device
101 scanner unit
102 printer unit
110 printer driver
111 preflight processing module
113 raster-image processing module
115 print engine
117 preflight checker
119 print-mode determination processor
LAN local area network

What is claimed is:

1. An image forming apparatus comprising:
a preflight image generator that generates first image data for a preflight check when a print job described in a page description language is input;
a print mode determiner that determines whether to execute the print job in a color print mode or a black-and-white print mode by analyzing pixel information of the first image data for the preflight check;
a preflight checker that performs the preflight check of the print job using the first image data for the preflight check;
a raster image processor that performs raster image processing in a print mode determined by the print mode determiner to the print job having been subjected to the preflight check by the preflight checker so as to generate second image data for printing; and
a print unit that executes the print job using the second image data for printing generated by the raster image processor, and performs printing processing in the print mode determined by the print mode determiner, wherein
the raster image processor performs the raster image processing by converting vector data of the print job into the second image data for printing independently of the generation of the first image data for the preflight check.

2. The image forming apparatus according to claim 1, further comprising
an analysis amount adjuster that adjusts
a resolution of the first image data for the preflight check generated by the preflight image generator, or
a ratio of pixels on which pixel information is analyzed by the print mode determiner among pixels of the first image data for the preflight check,
on a basis of setting contents of print setting information of the print job so as to equalize an analysis amount of pixel information by the print mode determiner regardless of a difference in setting contents of the print setting information.

3. The image forming apparatus according to claim 1, further comprising:
a priority-mode setting unit setting
a determination-speed prioritizing mode in which the print mode determiner determines the mode of the print job at a speed higher than a default speed, or
a determination-accuracy prioritizing mode in which the print mode determiner determines the mode of the print job at an accuracy higher than a default accuracy; and
an analysis amount changer that changes
a resolution of the first image data for the preflight check generated by the preflight image generator, or
a ratio of pixels on which pixel information is analyzed by the print mode determiner among pixels of the first image data for the preflight check,
to cause an analysis amount of pixel information by the print mode determiner to be smaller than a default analysis amount defined based on setting contents of print setting information of the print job when the determination-speed prioritizing mode is set in the priority-mode setting unit, and to cause the analysis amount to be larger than the default analysis amount when the determination-accuracy prioritizing mode is set in the priority-mode setting unit.

4. The image forming apparatus according to claim 1, wherein the preflight check includes at least one of:

a check on whether the vector data is not damaged, a check on whether data of an image that is set as an embedded object of a print image in print setting information of the print job is included in the vector data, and a check on whether a font stored and retained in an external storage device of the image forming apparatus is set in the print setting information of the print job as a font to be used for printing of characters and symbols of a print image.

* * * * *